United States Patent
Deshmukh et al.

(10) Patent No.: US 9,842,154 B2
(45) Date of Patent: Dec. 12, 2017

(54) SECURE DATA REPLICATION

(71) Applicant: NetApp Inc., Sunnyvale, CA (US)

(72) Inventors: Vijay M. Deshmukh, Fremont, CA (US); Pranab Patnaik, Cary, NC (US); Uday Madhav Joshi, Sunnyvale, CA (US); Kiyoshi James Komatsu, San Mateo, CA (US)

(73) Assignee: NetApp, Inc., Sunnyvale, CA (US)

( * ) Notice: Subject to any disclaimer, the term of this patent is extended or adjusted under 35 U.S.C. 154(b) by 33 days.

(21) Appl. No.: 15/142,016

(22) Filed: Apr. 29, 2016

(65) Prior Publication Data
US 2017/0316075 A1 Nov. 2, 2017

(51) Int. Cl.
*G06F 17/00* (2006.01)
*G06F 17/30* (2006.01)
*H04L 29/06* (2006.01)
*G06F 21/60* (2013.01)
*H04L 29/08* (2006.01)

(52) U.S. Cl.
CPC ...... *G06F 17/30581* (2013.01); *G06F 21/604* (2013.01); *H04L 63/08* (2013.01); *H04L 63/102* (2013.01); *H04L 63/20* (2013.01); *H04L 67/1095* (2013.01)

(58) Field of Classification Search
CPC . G06F 17/30581; G06F 21/604; H04L 63/08; H04L 63/102; H04L 63/20; H04L 67/1095
See application file for complete search history.

(56) References Cited

U.S. PATENT DOCUMENTS

| | | | |
|---|---|---|---|
| 8,234,253 B1 * | 7/2012 | Tyurin | G06F 11/1438 707/675 |
| 9,396,216 B2 * | 7/2016 | Barreto | G06F 17/30283 |
| 2005/0160281 A1 * | 7/2005 | Thibadeau | G06F 21/805 713/189 |
| 2007/0281664 A1 | 12/2007 | Kaneko et al. | |

(Continued)

FOREIGN PATENT DOCUMENTS

EP   2306319 A1   4/2011

OTHER PUBLICATIONS

Int. Search Report/Written Opinion cited in PCT/US2017/030372 dated Aug. 21, 2017, 12 pgs.

*Primary Examiner* — Techane Gergiso
(74) *Attorney, Agent, or Firm* — Cooper Legal Group, LLC

(57) ABSTRACT

One or more techniques and/or computing devices are provided for secure data replication. For example, a first storage controller may host first storage within which storage resources (e.g., files, logical unit numbers (LUNs), volumes, etc.) are stored. The first storage controller may establish an access policy with a001 second storage controller to which data is to be replicated from the first storage. The access policy may define an authentication mechanism for the first storage controller to authenticate the second storage controller, an authorization mechanism specifying a type of access that the second storage controller has for a storage resource, and an access control mechanism specifying how the second storage controller's access to data of the storage resource is to be controlled. In this way, data replication requests may be authenticated and authorized so that data may be provided, according to the access control mechanism, in a secure manner.

20 Claims, 14 Drawing Sheets

(56) References Cited

U.S. PATENT DOCUMENTS

| | | | |
|---|---|---|---|
| 2008/0104418 A1* | 5/2008 | Parnell | G06F 21/6272 |
| | | | 713/193 |
| 2010/0030982 A1* | 2/2010 | Sela | G06F 21/10 |
| | | | 711/162 |
| 2012/0089567 A1 | 4/2012 | Takahashi et al. | |
| 2012/0124386 A1* | 5/2012 | Lin | G06F 21/6218 |
| | | | 713/182 |
| 2014/0007239 A1* | 1/2014 | Sharpe | G06F 21/561 |
| | | | 726/24 |
| 2014/0052864 A1* | 2/2014 | Van Der Linden | G06F 9/5077 |
| | | | 709/226 |
| 2015/0156136 A1* | 6/2015 | Holt | G06F 17/30575 |
| | | | 709/225 |

* cited by examiner

SECURE DATA REPLICATION

BACKGROUND

Many storage networks may implement data replication and/or other redundancy data access techniques for data loss protection and non-disruptive client access. For example, a first storage cluster may comprise a first storage controller configured to provide clients with primary access to data stored within a first storage device and/or other storage devices. A second storage cluster may comprise a second storage controller configured to provide clients with primary access to data stored within a second storage device and/or other storage devices. The first storage controller and the second storage controller may be configured according to a disaster recovery relationship, such that the second storage controller may provide failover access to replicated data that was replicated from the first storage device to a secondary storage device, owned by the first storage controller, but accessible to the second storage controller (e.g., a switchover operation may be performed where the second storage controller assumes ownership of the secondary storage device and/or other storage devices previously owned by the first storage controller so that the second storage controller may provide clients with failover access to replicated data within such storage devices). In an example of a logical replication scheme, the second storage controller has ownership of the replicated data. The second storage controller may provide read-only access to the replicated data. The second storage controller may convert the replicated data to full read-write access upon failover. In an example of physical replication, the storage device, comprising the replicated data, is owned by the first storage controller until a failover/switchover to the second storage controller occurs.

In an example, the second storage cluster may be located at a remote site to the first storage cluster (e.g., storage clusters may be located in different buildings, cities, thousands of kilometers from one another, etc.). Thus, if a disaster occurs at a site of a storage cluster, then a surviving storage cluster may remain unaffected by the disaster (e.g., a power outage of a building hosting the first storage cluster may not affect a second building hosting the second storage cluster in a different city).

In an example, two storage controllers within a storage cluster may be configured according to a high availability configuration, such as where the two storage controllers are locally connected to one another and/or to the same storage devices. In this way, when a storage controller fails, then a high availability partner storage controller can quickly takeover for the failed storage controller due to the local connectivity. Thus, the high availability partner storage controller may provide clients with access to data previously accessible through the failed storage controller.

In an example of a high availability configuration, high availability to data may be provided without using shared storage. In particular, high availability to data can be provided using a synchronous replicated copy of a primary storage object. The high availability to data may be provided through a software defined architecture, using synchronous replication, and is not limited to merely two storage controllers.

Various replication and synchronization techniques may be used to replicate data (e.g., client data), configuration data (e.g., a size of a volume, a name of a volume, logical unit number (LUN) configuration data, etc.), and/or write caching data (e.g., cached write operations not yet flushed to a storage device, but cached within memory such as a non-volatile random access memory (NVRAM)) between storage controllers and/or storage devices. Synchronous replication may be used where an incoming write operation to the first storage controller is locally implemented upon a first storage object (e.g., a file, a LUN, a LUN spanning multiple volumes, or any other type of object) by the first storage controller and remotely implemented upon a second storage object (e.g., maintained as a fully synchronized copy of the first storage object) by the second storage controller before an acknowledgement is provided back to a client that sent the incoming write operation. In another example, asynchronous replication may be achieved by capturing snapshots of a volume, determining data differences (e.g., deltas) between a current snapshot and a last snapshot used to replicate data to the second storage object, and using incremental transfers to send the data differences to the second storage controller for implementation upon the second storage object. Semi-synchronous replication may be achieved where an acknowledgment back to a client for a write request is based upon local implementation upon the first storage object, but is not dependent upon remote implementation upon the second storage object.

Data replication may be implemented for various storage environments, such as between storage controllers within the same network, storage controllers connected across a public network (e.g., replication from a storage controller at a storage site and a second storage controller at a remote storage site for disaster recovery purposes), etc. Unsecure transfer of data, such as across the public network, may be undesirable because unauthorized access to data may occur (e.g., a malicious entity may attempt to spoof as a storage controller in order to gain access to sensitive client data). Unfortunately, replication security may merely be available for homogenous storage controllers, but not for heterogeneous storage controllers such as storage controllers with different storage architectures, storage operating systems, file systems, etc.

DETAILED DESCRIPTION

Figure 1:
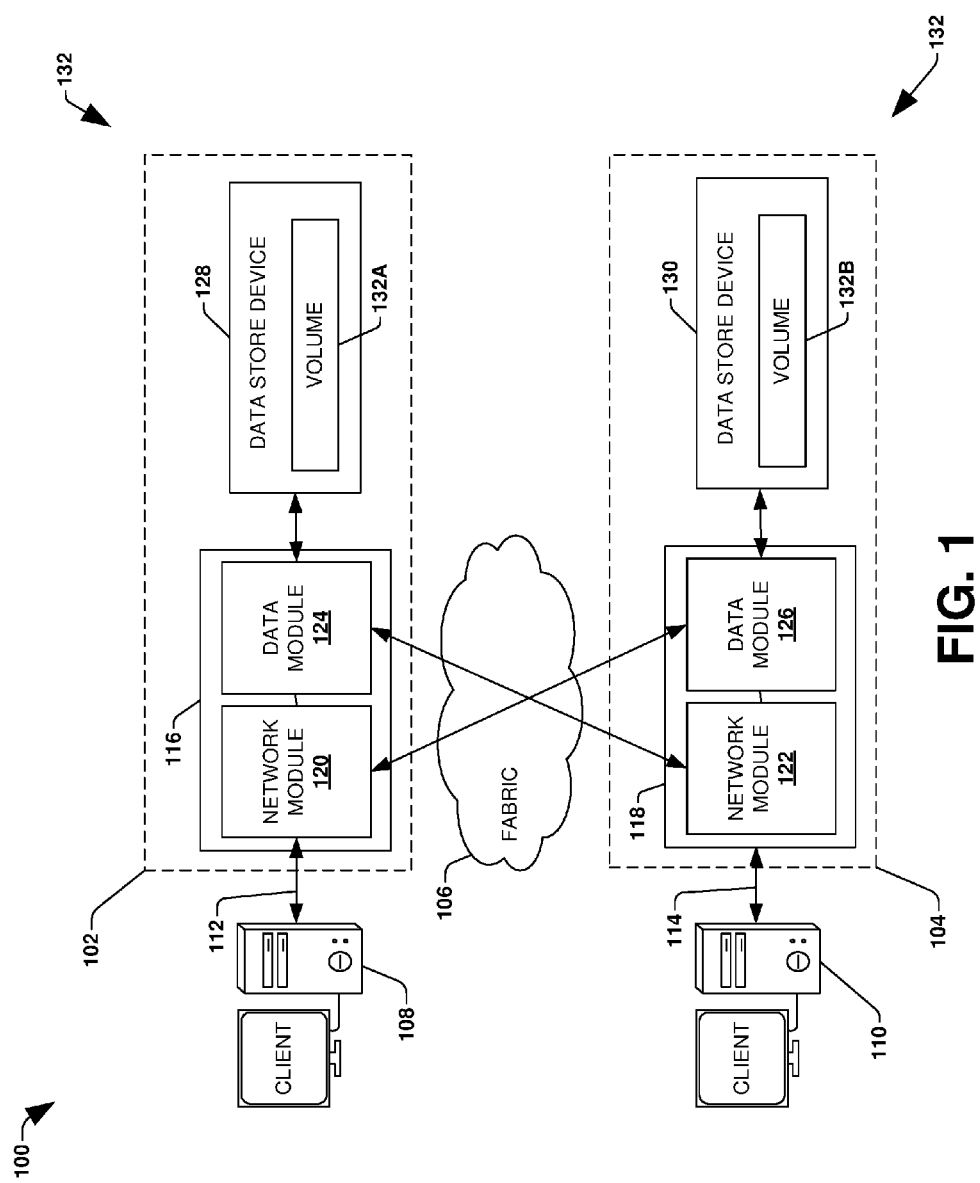
FIG. 1 is a component block diagram illustrating an example clustered network in accordance with one or more of the provisions set forth herein.

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

One or more techniques and/or computing devices for secure data replication are provided herein. For example, a first storage controller may host first storage within which storage resources (e.g., files, logical unit numbers (LUNs), directories, volumes, etc.) are stored. Storage administrators of the first storage controller and a second storage controller may desire to establish a replication relationship between the first storage controller and the second storage controller in a secure manner for replicating data from the first storage to second storage hosted by the second storage controller (e.g., for data protection such as where if the first storage controller fails, then the second storage controller may provide clients with failover access to replicated data within the second storage because the failed first storage controller is unable to provide clients with access to the first storage).

Accordingly, an access policy may be established for a storage resource within the first storage (e.g., at an arbitrary level of granularity such as for a volume, file, LUN, consistency group of files and/or LUNs, and/or any other storage object within the first storage). The access policy may define an authentication mechanism for the first storage controller to authenticate the second storage controller (e.g., password authentication, public/private key authentication, certificate authentication, or other authentication used to determine that a data replication request originated from the second storage controller and that the second storage controller is not being spoofed). The access policy may define an authorization mechanism specifying a type of access that the second storage controller has for the storage resource (e.g., read access, read and write access, etc.). The access policy may define an access control mechanism (e.g., whether data of the storage resource is to be encrypted when being sent to the second storage controller). In an example, the access policy may establish a way for heterogeneous storage controllers (e.g., the first storage controller and the second storage controller may have different storage architectures, storage operating systems, file systems, etc.) to securely replicate data. In another example, the access policy may be established between homogenous storage controllers (e.g., end points with similar architectures). It may be appreciated that access polices may be established between any identities corresponding to recognizable entities (e.g., a device identifiable through an IP address, a device having a recognizable name, a device recognized within a domain, a peered storage virtual machine, a peered cluster, etc.).

To provide context for secure data replication, FIG. 1 illustrates an embodiment of a clustered network environment 100 or a network storage environment. It may be appreciated, however, that the techniques, etc. described herein may be implemented within the clustered network environment 100, a non-cluster network environment, and/or a variety of other computing environments, such as a desktop computing environment. That is, the instant disclosure, including the scope of the appended claims, is not meant to be limited to the examples provided herein. It will be appreciated that where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

FIG. 1 is a block diagram illustrating the clustered network environment 100 that may implement at least some embodiments of the techniques and/or systems described herein. The clustered network environment 100 comprises data storage systems 102 and 104 that are coupled over a cluster fabric 106, such as a computing network embodied as a private Infiniband, Fibre Channel (FC), or Ethernet network facilitating communication between the data storage systems 102 and 104 (and one or more modules, component, etc. therein, such as, nodes 116 and 118, for example). It will be appreciated that while two data storage systems 102 and 104 and two nodes 116 and 118 are illustrated in FIG. 1, that any suitable number of such components is contemplated. In an example, nodes 116, 118 comprise storage controllers (e.g., node 116 may comprise a primary or local storage controller and node 118 may comprise a secondary or remote storage controller) that provide client devices, such as host devices 108, 110, with access to data stored within data storage devices 128, 130. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, in one embodiment a clustered network can be distributed over a plurality of storage systems and/or nodes located in a plurality of geographic locations; while in another embodiment a clustered network can include data storage systems (e.g., 102, 104) residing in a same geographic location (e.g., in a single onsite rack of data storage devices).

In the illustrated example, one or more host devices 108, 110 which may comprise, for example, client devices, personal computers (PCs), computing devices used for storage (e.g., storage servers), and other computers or peripheral devices (e.g., printers), are coupled to the respective data storage systems 102, 104 by storage network connections 112, 114. Network connection may comprise a local area network (LAN) or wide area network (WAN), for example, that utilizes Network Attached Storage (NAS) protocols, such as a Common Internet File System (CIFS) protocol or a Network File System (NFS) protocol to exchange data packets, a Storage Area Network (SAN) protocol, such as Small Computer System Interface (SCSI) or Fiber Channel Protocol (FCP), an object protocol, such as S3, etc. Illustratively, the host devices 108, 110 may be general-purpose computers running applications, and may interact with the data storage systems 102, 104 using a client/server model for exchange of information. That is, the host device may request data from the data storage system (e.g., data on a storage device managed by a network storage control configured to process I/O commands issued by the host device for the storage device), and the data storage system may return results of the request to the host device via one or more storage network connections 112, 114.

The nodes 116, 118 on clustered data storage systems 102, 104 can comprise network or host nodes that are interconnected as a cluster to provide data storage and management services, such as to an enterprise having remote locations, cloud storage (e.g., a storage endpoint may be stored within a data cloud), etc., for example. Such a node in the clustered network environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system.

In an example, a first cluster of nodes such as the nodes 116, 118 (e.g., a first set of storage controllers configured to provide access to a first storage aggregate comprising a first logical grouping of one or more storage devices) may be located on a first storage site. A second cluster of nodes, not illustrated, may be located at a second storage site (e.g., a second set of storage controllers configured to provide access to a second storage aggregate comprising a second logical grouping of one or more storage devices). The first cluster of nodes and the second cluster of nodes may be configured according to a disaster recovery configuration where a surviving cluster of nodes provides switchover access to storage devices of a disaster cluster of nodes in the event a disaster occurs at a disaster storage site comprising the disaster cluster of nodes (e.g., the first cluster of nodes provides client devices with switchover data access to storage devices of the second storage aggregate in the event a disaster occurs at the second storage site).

As illustrated in the clustered network environment 100, nodes 116, 118 can comprise various functional components that coordinate to provide distributed storage architecture for the cluster. For example, the nodes can comprise network modules 120, 122 and data modules 124, 126. Network modules 120, 122 can be configured to allow the nodes 116, 118 (e.g., network storage controllers) to connect with host devices 108, 110 over the storage network connections 112, 114, for example, allowing the host devices 108, 110 to access data stored in the distributed storage system. Further, the network modules 120, 122 can provide connections with one or more other components through the cluster fabric 106. For example, in FIG. 1, the network module 120 of node 116 can access a second data storage device 130 by sending a request through the data module 126 of a second node 118.

Data modules 124, 126 can be configured to connect one or more data storage devices 128, 130, such as disks or arrays of disks, flash memory, or some other form of data storage, to the nodes 116, 118. The nodes 116, 118 can be interconnected by the cluster fabric 106, for example, allowing respective nodes in the cluster to access data on data storage devices 128, 130 connected to different nodes in the cluster. Often, data modules 124, 126 communicate with the data storage devices 128, 130 according to the SAN protocol, such as SCSI or FCP, for example. Thus, as seen from an operating system on nodes 116, 118, the data storage devices 128, 130 can appear as locally attached to the operating system. In this manner, different nodes 116, 118, etc. may access data blocks through the operating system, rather than expressly requesting abstract files.

It should be appreciated that, while the clustered network environment 100 illustrates an equal number of network and data modules, other embodiments may comprise a differing number of these modules. For example, there may be a plurality of network and data modules interconnected in a cluster that does not have a one-to-one correspondence between the network and data modules. That is, different nodes can have a different number of network and data modules, and the same node can have a different number of network modules than data modules.

Further, a host device 108, 110 can be networked with the nodes 116, 118 in the cluster, over the storage networking connections 112, 114. As an example, respective host devices 108, 110 that are networked to a cluster may request services (e.g., exchanging of information in the form of data packets) of nodes 116, 118 in the cluster, and the nodes 116, 118 can return results of the requested services to the host devices 108, 110. In one embodiment, the host devices 108, 110 can exchange information with the network modules 120, 122 residing in the nodes 116, 118 (e.g., network hosts) in the data storage systems 102, 104.

In one embodiment, the data storage devices 128, 130 comprise volumes 132, which is an implementation of storage of information onto disk drives or disk arrays or other storage (e.g., flash) as a file-system for data, for example. Volumes can span a portion of a disk, a collection of disks, or portions of disks, for example, and typically define an overall logical arrangement of file storage on disk space in the storage system. In one embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the clustered network environment 100, the host devices 108, 110 can utilize the data storage systems 102, 104 to store and retrieve data from the volumes 132. In this embodiment, for example, the host device 108 can send data packets to the network module 120 in the node 116 within data storage system 102. The node 116 can forward the data to the data storage device 128 using the data module 124, where the data storage device 128 comprises volume 132A. In this way, in this example, the host device can access the volume 132A, to store and/or retrieve data, using the data storage system 102 connected by the network connection 112. Further, in this embodiment, the host device 110 can exchange data with the network module 122 in the host 118 within the data storage system 104 (e.g., which may be remote from the data storage system 102). The host 118 can forward the data to the data storage device 130 using the data module 126, thereby accessing volume 132B associated with the data storage device 130.

It may be appreciated that secure data replication may be implemented within the clustered network environment 100. In an example, the node 116 (e.g., a first storage controller) may store a storage resource, such as volume 132A, within first storage. An access policy for the volume 132A may be established between the node 116 and the node 118 (e.g., a second storage controller). The access policy may be attached to a replication relationship between the node 116 and the node 118 so that data of the volume 132A may be securely replicated from the node 116 to the node 118. It may be appreciated that secure data replication may be implemented for and/or between any type of computing environment, and may be transferable between physical devices (e.g., node 116, node 118, a desktop computer, a tablet, a laptop, a wearable device, a mobile device, a storage device, a server, etc.) and/or a cloud computing environment (e.g., remote to the clustered network environment 100).

Figure 2:
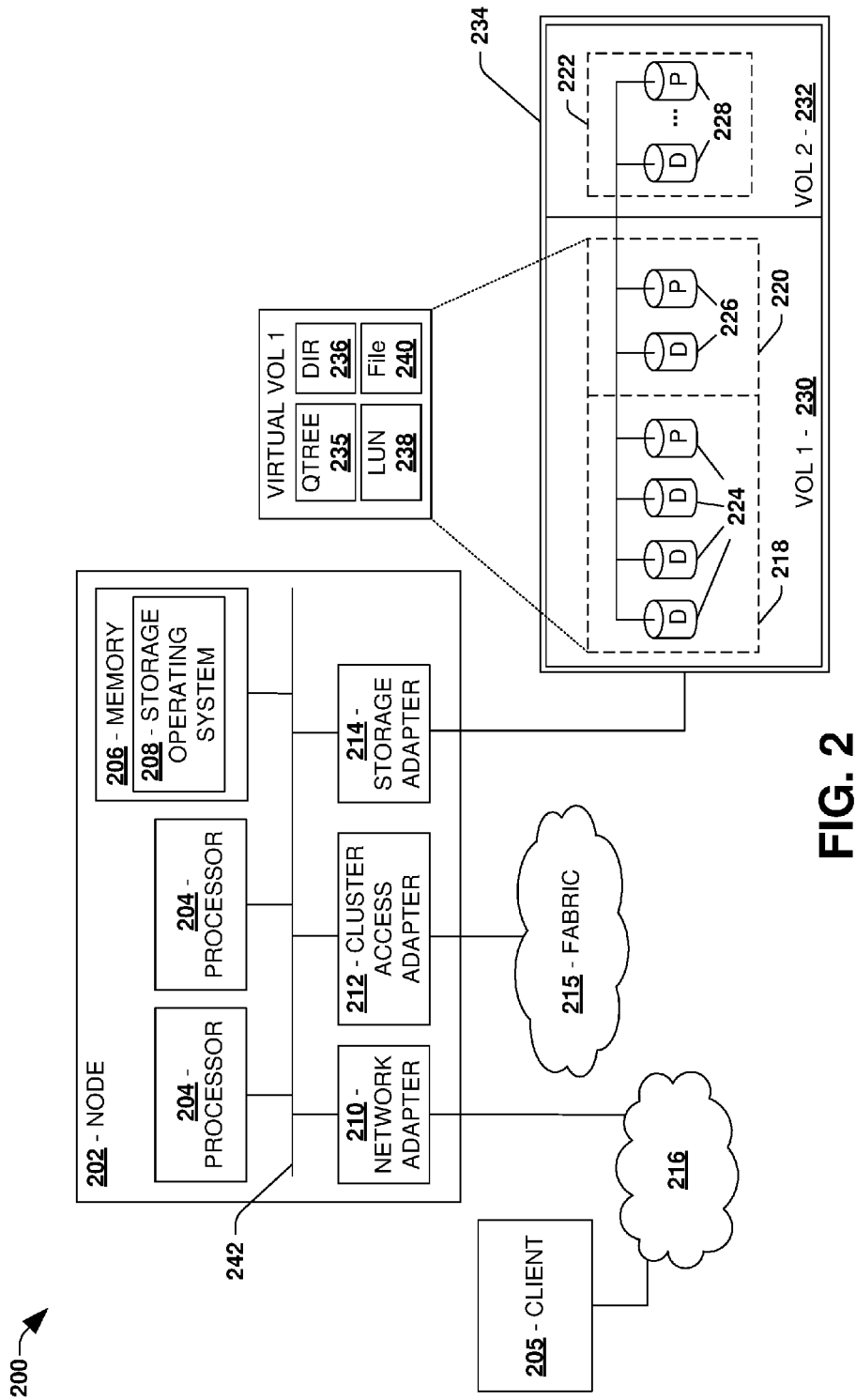
FIG. 2 is a component block diagram illustrating an example data storage system in accordance with one or more of the provisions set forth herein.

FIG. 2 is an illustrative example of a data storage system 200 (e.g., 102, 104 in FIG. 1), providing further detail of an embodiment of components that may implement one or more of the techniques and/or systems described herein. The data storage system 200 comprises a node 202 (e.g., host nodes 116, 118 in FIG. 1), and a data storage device 234 (e.g., data storage devices 128, 130 in FIG. 1). The node 202 may be a general purpose computer, for example, or some other computing device particularly configured to operate as a storage server. A host device 205 (e.g., 108, 110 in FIG. 1) can be connected to the node 202 over a network 216, for example, to provides access to files and/or other data stored on the data storage device 234. In an example, the node 202 comprises a storage controller that provides client devices, such as the host device 205, with access to data stored within data storage device 234.

The data storage device 234 can comprise mass storage devices, such as disks 224, 226, 228 of a disk array 218, 220, 222. It will be appreciated that the techniques and systems, described herein, are not limited by the example embodiment. For example, disks 224, 226, 228 may comprise any type of mass storage devices, including but not limited to magnetic disk drives, flash memory, and any other similar media adapted to store information, including, for example, data (D) and/or parity (P) information.

The node 202 comprises one or more processors 204, a memory 206, a network adapter 210, a cluster access adapter 212, and a storage adapter 214 interconnected by a system bus 242. The data storage system 200 also includes an operating system 208 installed in the memory 206 of the node 202 that can, for example, implement a Redundant Array of Independent (or Inexpensive) Disks (RAID) optimization technique to optimize a reconstruction process of data of a failed disk in an array.

The operating system 208 can also manage communications for the data storage system, and communications between other data storage systems that may be in a clustered network, such as attached to a cluster fabric 215 (e.g., 106 in FIG. 1). Thus, the node 202, such as a network storage controller, can respond to host device requests to manage data on the data storage device 234 (e.g., or additional clustered devices) in accordance with these host device requests. The operating system 208 can often establish one or more file systems on the data storage system 200, where a file system can include software code and data structures that implement a persistent hierarchical namespace of files and directories, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and network adapters 210, 212, 214 for storing related software application code and data structures. The processors 204 and network adapters 210, 212, 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing application instructions pertaining to the techniques described herein. For example, the operating system can also utilize one or more control files (not shown) to aid in the provisioning of virtual machines.

The network adapter 210 includes the mechanical, electrical and signaling circuitry needed to connect the data storage system 200 to a host device 205 over a network 216, which may comprise, among other things, a point-to-point connection or a shared medium, such as a local area network. The host device 205 (e.g., 108, 110 of FIG. 1) may be a general-purpose computer configured to execute applications. As described above, the host device 205 may interact with the data storage system 200 in accordance with a client/host model of information delivery.

The storage adapter 214 cooperates with the operating system 208 executing on the node 202 to access information requested by the host device 205 (e.g., access data on a storage device managed by a network storage controller). The information may be stored on any type of attached array of writeable media such as magnetic disk drives, flash memory, and/or any other similar media adapted to store information. In the example data storage system 200, the information can be stored in data blocks on the disks 224, 226, 228. The storage adapter 214 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 214 and, if necessary, processed by the one or more processors 204 (or the storage adapter 214 itself) prior to being forwarded over the system bus 242 to the network adapter 210 (and/or the cluster access adapter 212 if sending to another node in the cluster) where the information is formatted into a data packet and returned to the host device 205 over the network 216 (and/or returned to another node attached to the cluster over the cluster fabric 215).

In one embodiment, storage of information on disk arrays 218, 220, 222 can be implemented as one or more storage volumes 230, 232 that are comprised of a cluster of disks 224, 226, 228 defining an overall logical arrangement of disk space. The disks 224, 226, 228 that comprise one or more volumes are typically organized as one or more groups of RAIDs. As an example, volume 230 comprises an aggregate of disk arrays 218 and 220, which comprise the cluster of disks 224 and 226.

In one embodiment, to facilitate access to disks 224, 226, 228, the operating system 208 may implement a file system (e.g., write anywhere file system) that logically organizes the information as a hierarchical structure of directories and files on the disks. In this embodiment, respective files may be implemented as a set of disk blocks configured to store information, whereas directories may be implemented as specially formatted files in which information about other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume corresponds to at least a portion of physical storage devices whose address, addressable space, location, etc. doesn't change, such as at least some of one or more data storage devices 234 (e.g., a Redundant Array of Independent (or Inexpensive) Disks (RAID system)). Typically the location of the physical volume doesn't change in that the (range of) address(es) used to access it generally remains constant.

A virtual volume, in contrast, is stored over an aggregate of disparate portions of different physical storage devices. The virtual volume may be a collection of different available portions of different physical storage device locations, such as some available space from each of the disks 224, 226, and/or 228. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, Qtrees 235, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual drives, such that they emulate a hard drive from a general purpose computer, while they actually comprise data blocks stored in various parts of a volume.

In one embodiment, one or more data storage devices 234 can have one or more physical ports, wherein each physical port can be assigned a target address (e.g., SCSI target address). To represent respective volumes stored on a data storage device, a target address on the data storage device can be used to identify one or more LUNs 238. Thus, for example, when the node 202 connects to a volume 230, 232 through the storage adapter 214, a connection between the node 202 and the one or more LUNs 238 underlying the volume is created.

In one embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 230 by using one or more addresses that identify the one or more LUNs 238.

It may be appreciated that secure data replication may be implemented for the data storage system 200. In an example, the node 202 (e.g., a first storage controller) may store a storage resource, such as volume 230, within first storage. An access policy for the volume 230 may be established between the node 202 and a second node (e.g., a second storage controller). The access policy may be attached to a replication relationship between the node 202 and the second node so that data of the volume 230 may be securely replicated from the node 202 to the second node. It may be appreciated that secure data replication may be implemented for and/or between any type of computing environment, and may be transferable between physical devices (e.g., node 202, host device 205, a desktop computer, a tablet, a laptop, a wearable device, a mobile device, a storage device, a server, etc.) and/or a cloud computing environment (e.g., remote to the node 202 and/or the host device 205).

Figure 3:
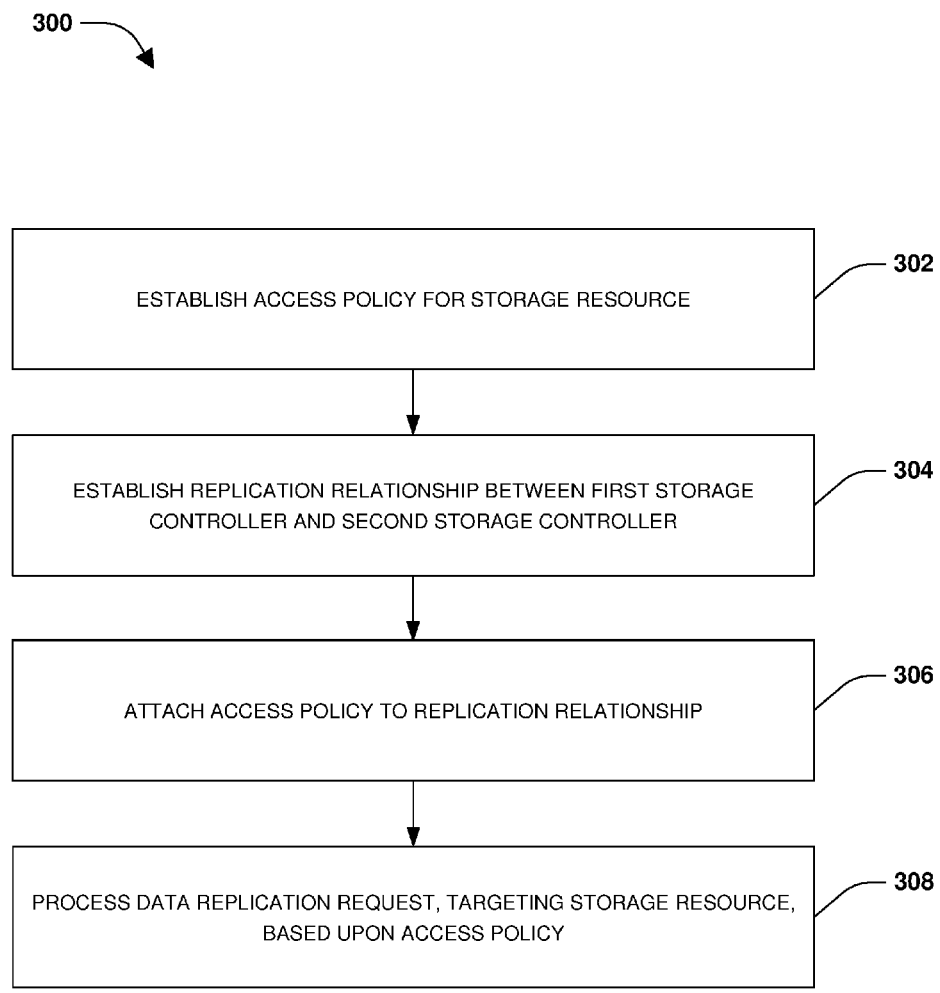
FIG. 3 is a flow chart illustrating an exemplary method of secure data replication.

One embodiment of secure data replication is illustrated by an exemplary method 300 of FIG. 3. A first storage controller may host first storage within which storage resources (e.g., files, LUNs, directories, volumes, consistency groups of files and/or LUNs, and/or any other type of storage object), such as a first volume and a second volume, may be stored. A second storage controller may desire to establish a replication relationship with the first storage controller (e.g., a replication relationship between a first storage virtual machine of the first storage controller and a second storage virtual machine of the second storage controller) for securely replicating a storage resource, such as data of the first volume, from the first storage to second storage hosted by the second storage controller (e.g., replication using a baseline transfer of the storage resource to transfer data of the storage resource using a snapshot of the storage resource and/or replication using incremental transfers of delta data of the storage resource, where the delta data corresponds to changes to the storage resource since a last transfer of data of the storage resource to the second storage controller). The first storage controller and the second storage controller may be connected over a network (e.g., a private network, a public network, etc.). In an example, the first storage controller and the second storage controller may be heterogeneous storage controllers with different storage architectures, storage operating systems, files systems, etc., and thus secure replication of data may not be natively supported.

Accordingly, an access policy for the storage resource may be established for facilitating secure data replication (e.g., a default access policy with default authentication, authorization, and access controller; an access policy with custom authentication, authorization, and access control negotiated between the first storage controller and the second storage controller; etc.), at 302. The access policy may be specified at a storage resource granularity (e.g., for a particular file, LUN, volume, directory, etc.). In an example, an authentication mechanism, for authenticating the second storage controller as having a trusted relationship with the first storage controller, may be defined within the access policy. The authentication mechanism may be defined based upon a negotiation between the first storage controller and the second storage controller of a certificate authentication mechanism (e.g., a certificate that will be validating by a third party certificating authority), a password authentication mechanism (e.g., a one-time password, a shared common password, etc.), public/private key authentication mechanism, and/or an automatic authentication mechanism (e.g., data replication requests from the second storage controller may be automatically authenticated without further evaluation or scrutiny). The authentication mechanism may be used by the first storage controller to determine whether a data replication request to access the storage resource actually came from the second storage controller (e.g., that the second storage controller is not being spoofed).

In another example, an authorization mechanism, specifying a type of access that the second storage controller has for the storage resource (e.g., read access, write access, no access, time restricted access for requesting replication of data at certain dates and times, size restricted access for requesting replication of a certain amount of data, resource utilization restricted access for requesting replication of data that will utilize a certain amount of processing and bandwidth resources, etc.), may be defined within the access policy. The authorization mechanism may be used by the first storage controller to determine whether a requested type of access of a data replication request is permitted or not. In an example, authorization mechanisms may be specified for various storage resources, such as the second volume (e.g., the second storage controller may be granted read access to the first volume, read/write access to the second volume, and no access to a third volume).

In another example, an access control mechanism specifying how the second storage controller's access to data of the storage resource is to be controlled, may be defined within the access policy. For example, the access control mechanism may be defined based upon a negotiation between the first storage controller and the second storage controller of whether data is to be encrypted before being sent to the second storage controller (e.g., a negotiation of an encryption key that the first storage controller will use to encrypt requested data of the first volume to send to the second storage controller; a negotiation to not use encryption; etc.). It may be appreciated that various access control mechanisms may be negotiated (e.g., temporal restrictions where data is only accessible at certain times or will be send within a threshold amount of time; resource restrictions where data will be transferred only if a threshold amount of resources are available; a destination restriction that restricts where data will be transferred; a frequency of data replication request processing; a mode of transport for sending data to the second storage controller; etc.).

In this way, the first storage controller may establish an access policy for providing the second storage controller with access to storage resources. The second storage controller may establish a corresponding access policy comprising parameters associated with the authentication mechanism (e.g., a password), the authorization mechanism (e.g., an indication that read access is allowed for the first volume, write access is allowed for the second volume, no access is allowed for the third volume, etc.), and/or the access control mechanism (e.g., a decryption key). In this way, the second storage controller may utilize the parameters for constructing data replication requests to send to the first storage controller for accessing the storage resources. In an example, the first storage controller may unilaterally modify the access policy without consent from the second storage controller because the first storage controller is the owner of the storage resource.

At 304, a replication relationship (e.g., a snapshot replication relationship where snapshots of the storage resource are used to replicate data to the second storage controller) may be established between the first storage controller and the second storage controller for replicating data from the first storage to second storage hosted by the second storage controller. At 306, the access policy may be attached to the replication relationship. In an example the second storage controller may attach the corresponding access policy to the replication relationship.

At 308, a data replication request, targeting the storage resource, may be processed based upon the access policy (e.g., parameters, such as a password, a certificate, etc., within the data replication request may be processed). For example, the data replication request may be associated with the replication relationship (e.g., a request to replicate data from the first storage to a replication destination, such as the second storage of the second storage controller). The authentication mechanism may be used to determine whether the data replication request originated from the second storage controller (e.g., whether a password, a key, a certificate, or any other identification indicator within the data replication request is indicative of the data replication request originating from the second storage controller and not a malicious entity attempting to spoof as the second storage controller). The authorization mechanism may be utilized to determine whether a requested type of access to the storage resource is authorized for the second storage controller (e.g., whether requested read or write access to the storage resource is allowed). Responsive to successful authentication and authorization, access to the data may be provided according to the access control mechanism (e.g., the data may be encrypted using the encryption key if encryption is specified by the access control mechanism).

In an example, the access policy may be specified between the first storage controller and the second storage controller for a single storage resource (e.g., an access policy for a file, LUN, volume, or other storage object granularity) or for multiple storage resources (e.g., a first access policy for a grouping of high valued data such as where encryption is used and read only access is provided; a second access policy for a grouping of low valued data such as where no encryption is used and read/write access is provided; etc.) In an example, the access policy may be shared with other storage controllers. For example, the access policy may be attached as a shared access policy to a second replication relationship between the first storage controller and a third storage controller. The shared access policy may associate the authentication mechanism, the authorization mechanism, and/or the access control mechanism with the third storage controller.

In an example, the first storage controller may establish a second access policy, for the storage resource, with a third storage controller. A second authentication mechanism, for authenticating the third storage controller as having a second trusted relationship with the first storage controller, may be defined within the second access policy. A second authorization mechanism, specifying a second type of access that the third storage controller has for the storage resource, may be defined within the second access policy. A second access control mechanism, specifying how the third storage controller's access to data of the storage resource is to be controlled, may be defined within the second access policy. The second authentication mechanism, the second authorization mechanism, and the second access control mechanism may be the same or different than the authentication mechanism, the authorization mechanism, and/or the access control mechanism (e.g., the first storage controller may encrypt data sent to the second storage controller but not data sent to the third storage controller; the first storage controller may authenticate the second storage controller using a certificate and may automatically authenticate the third storage controller without further scrutiny; the first storage controller may provide the second storage controller with read access to the storage resource and the third storage controller with read and write access to the storage resource; etc.).

Figure 4A:
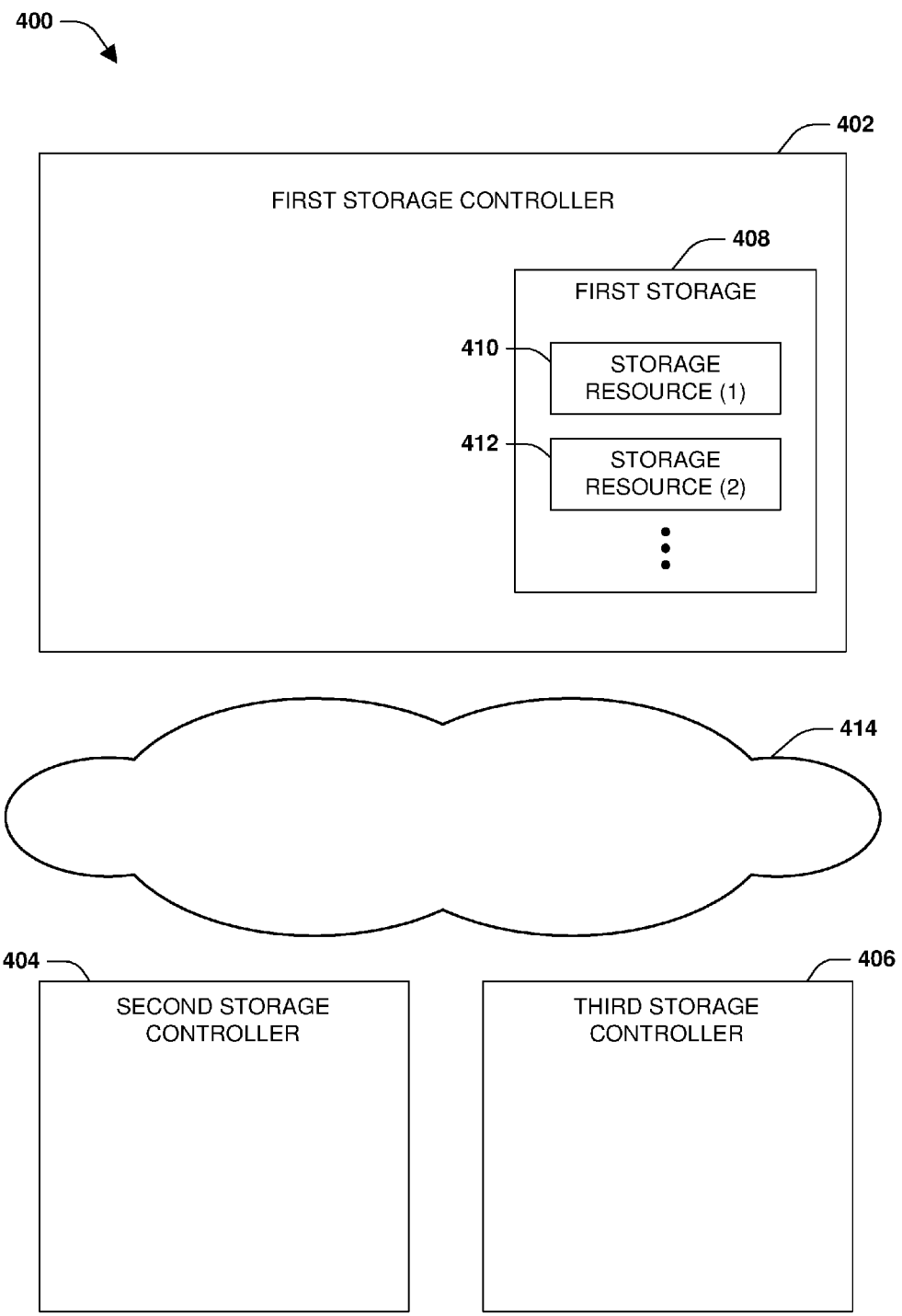
FIG. 4A is a component block diagram illustrating an exemplary computing device for secure data replication.

FIGS. 4A-4J illustrate examples of a system 400 for secure data replication. FIG. 4A illustrates a first storage controller 402, a second storage controller 404, and a third storage controller 406 that are capable of communicating over a network 414. In an example, the first storage controller 402, the second storage controller 404, and/or the third storage controller 406 may be heterogeneous storage controllers that do not natively support secure data replication because such storage controllers may have different storage architectures, storage operating systems, and/or file systems. In another example, the first storage controller 402, the second storage controller 404, and/or the third storage controller 406 may be homogenous storage controllers with similar storage architectures, storage operating systems, and/or file systems. The first storage controller 402 may host first storage 408 within which a first storage resource 410, a second storage resource 412, and/or other storage resources (e.g., files, LUNs, volumes, consistency groups, directories, and/or other storage objects) may be stored.

Figure 4B:
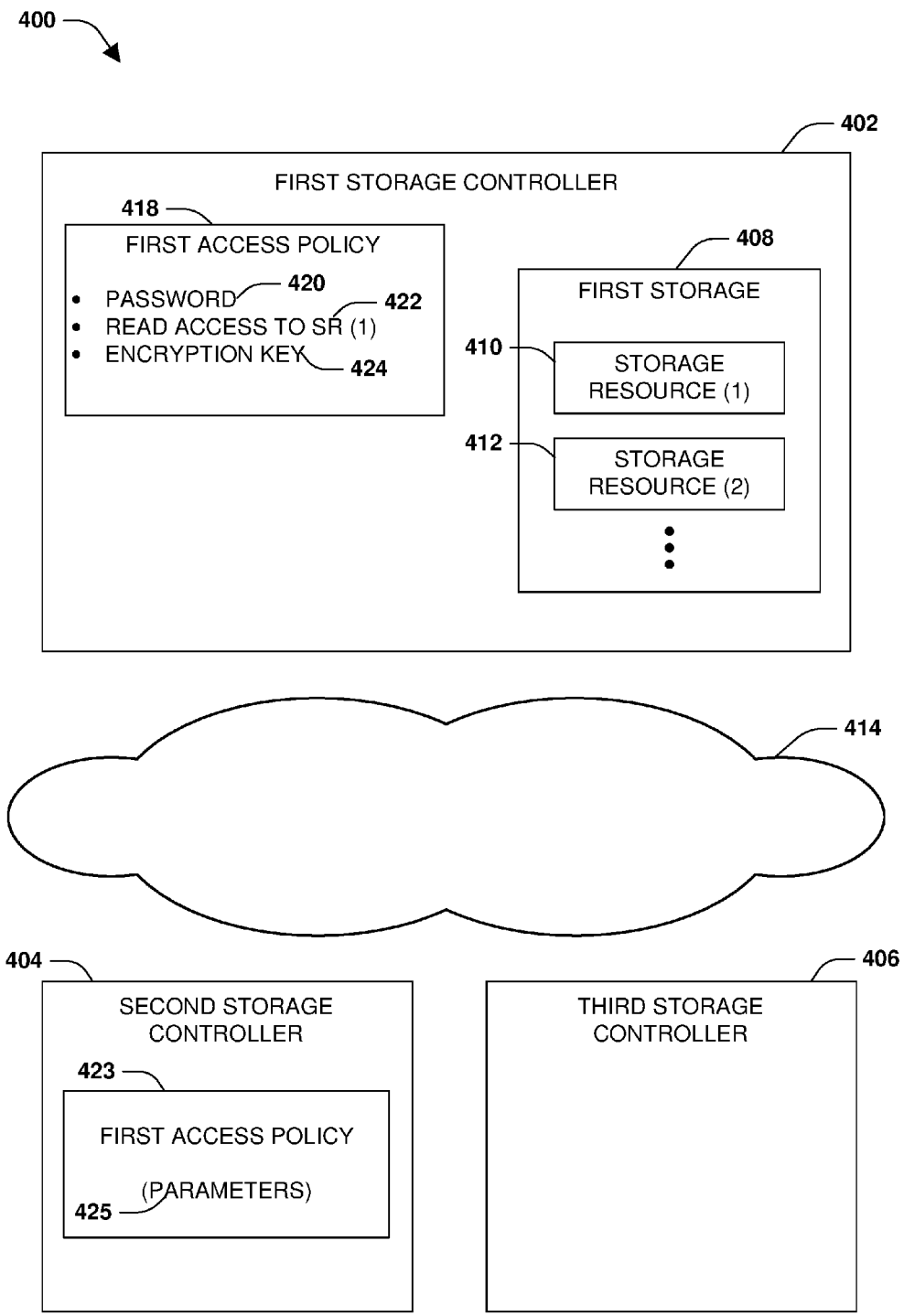
FIG. 4B is a component block diagram illustrating an exemplary computing device for secure data replication, where a first access policy is established.

FIG. 4B illustrates the first storage controller 402 and the second storage controller 404 establishing a first access policy 418 and a corresponding first access policy 423. For example, the first storage controller 402 and the second storage controller 404 may negotiate to define an authentication mechanism 420 (e.g., a password authentication mechanism specifying a password that the second storage controller 404 will subsequently provide with data replication requests to prove that such data replication requests originated from the second storage controller 404), an authorization mechanism 422 (e.g., authorization for the second storage controller 404 to read data of the first storage resource 410), and/or an access controller mechanism 424 (e.g., an encryption key that the first storage controller 402 will use to encrypt data of the first storage resource 410 to send to the second storage controller 404) for inclusion within the first access policy 418. The second storage controller 404 may establish the corresponding first access policy 423 to comprise parameters 425 corresponding to the authentication mechanism 420, the authorization mechanism 422, and/or the access control mechanism 424.

Figure 4C:
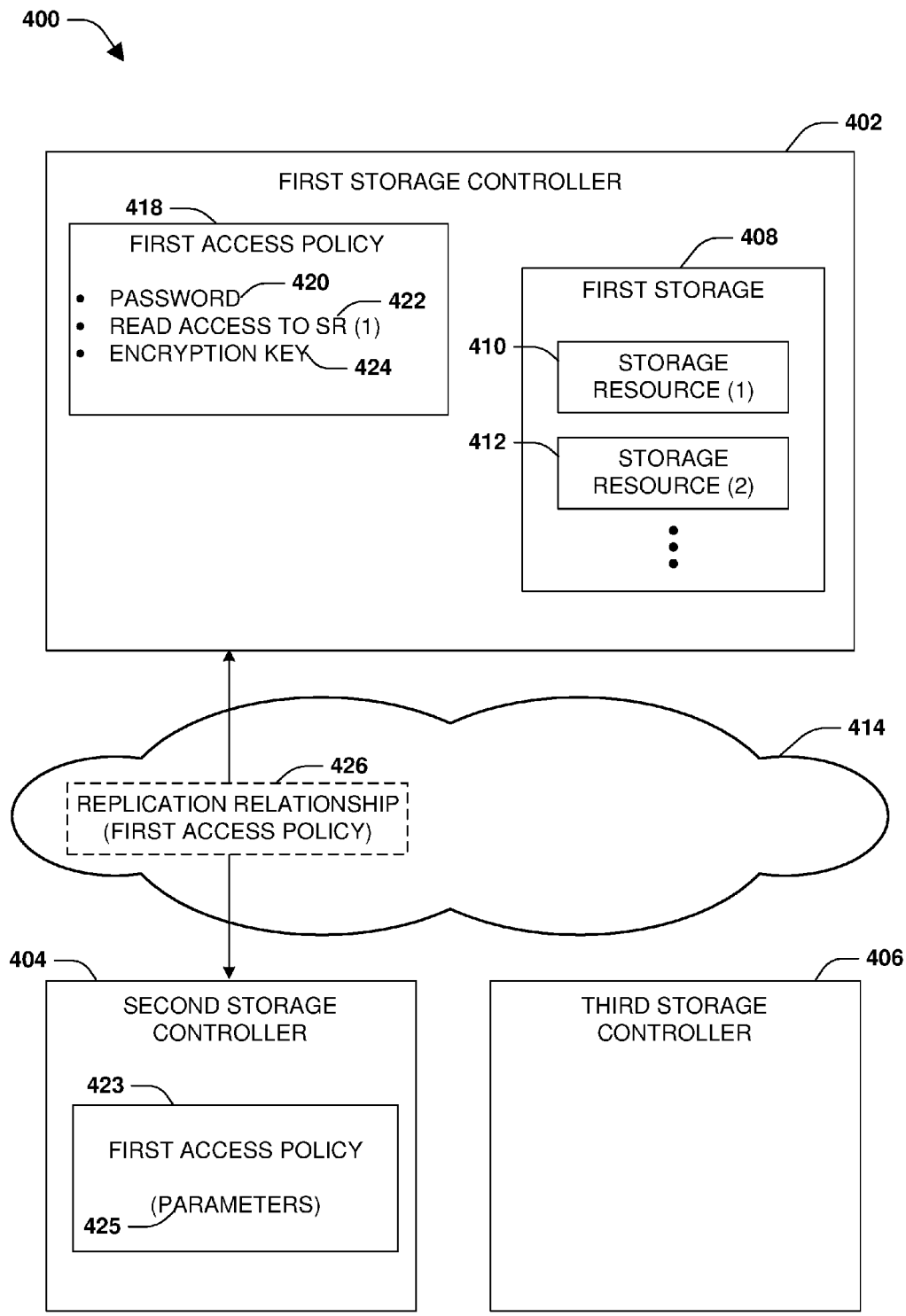
FIG. 4C is a component block diagram illustrating an exemplary computing device for secure data replication, where a replication relationship is established.

FIG. 4C illustrates a replication relationship 426 being established between the first storage controller 402 and the second storage controller 404. For example, the replication relationship 426 may be established so that data of the first storage 408, such as the first storage resource 410, may be replicated to the second storage controller 404, such as for disaster recovery purposes (e.g., snapshots of the first storage 408 may be evaluated to identify delta data, such as new data, deleted data, and/or modified data since a last transfer of data to the second storage controller 404, to transfer to the second storage controller 404 for data replication). The first storage controller 402 may attach the first access policy 418 to the replication relationship 426. The second storage controller 404 may attach the corresponding first access policy 423 to the replication relationship 426.

Figure 4D:
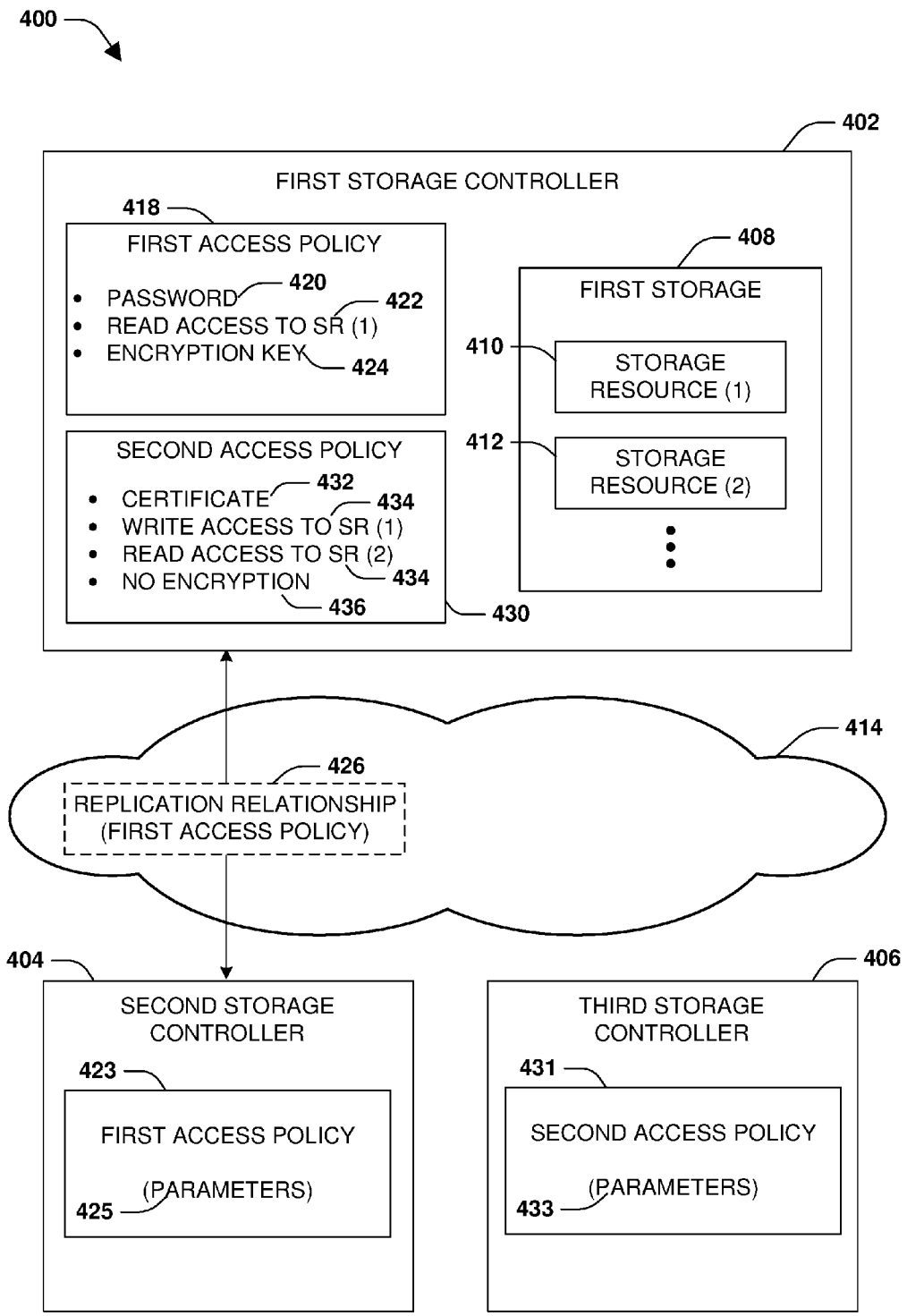
FIG. 4D is a component block diagram illustrating an exemplary computing device for secure data replication, where a second access policy is established.

FIG. 4D illustrates the first storage controller 402 and the third storage controller 406 establishing a second access policy 430 and a corresponding second access policy 431. For example, the first storage controller 402 and the third storage controller 406 may negotiate to define a second authentication mechanism 432 (e.g., a certificate authentication mechanism specifying that the third storage controller 406 will subsequently provide a certificate with data replication requests to prove that such data replication requests originated from the third storage controller 406), a second authorization mechanism 434 (e.g., authorization for the third storage controller 406 to read and write to data of the first storage resource 410 and read data of the second storage resource 412), and/or a second access controller mechanism 436 (e.g., the first storage controller 402 will send data to the third storage controller 406 without encryption) for inclusion within the second access policy 430. The third storage controller 406 may establish the corresponding second access policy 431 to comprise parameters 433 corresponding to the second authentication mechanism 432, the second authorization mechanism 434, and/or the second access control mechanism 436.

Figure 4E:
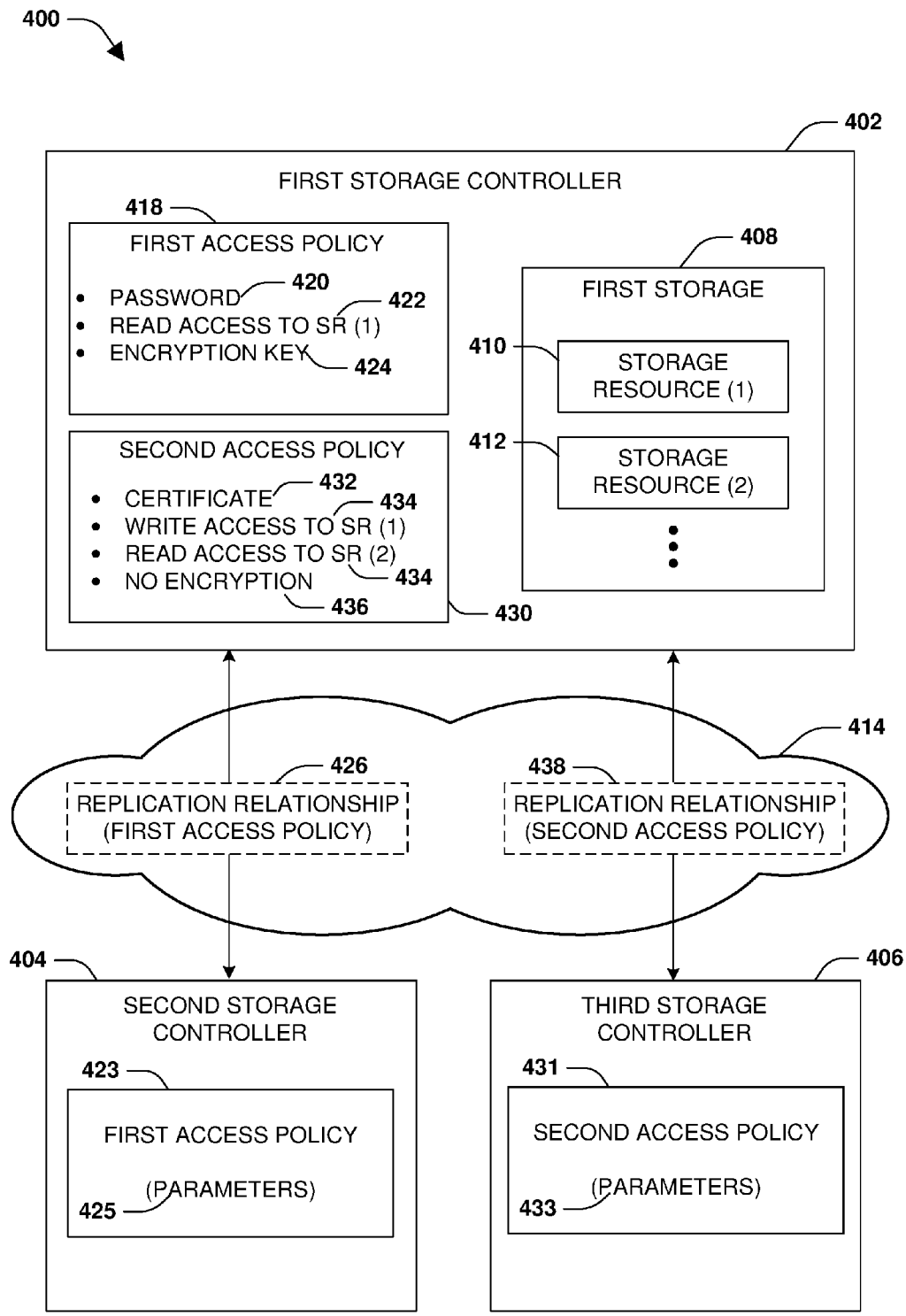
FIG. 4E is a component block diagram illustrating an exemplary computing device for secure data replication, where a second replication relationship is established.

FIG. 4E illustrates a second replication relationship 438 being established between the first storage controller 402 and the third storage controller 406. For example, the second replication relationship 438 may be established so that data of the first storage 408, such as the first storage resource 410 and/or the second storage resource 412, may be replicated to the third storage controller 406, such as for disaster recovery purposes (e.g., snapshots of the first storage 408 may be evaluated to identify delta data, such as new data, deleted data, and/or modified data since a last transfer of data to the third storage controller 406, to transfer to the third storage controller 406 for data replication). The first storage controller 402 may attach the second access policy 430 to the second replication relationship 438. The third storage controller 406 may attach the corresponding second access policy 431 to the second replication relationship 438.

Figure 4F:
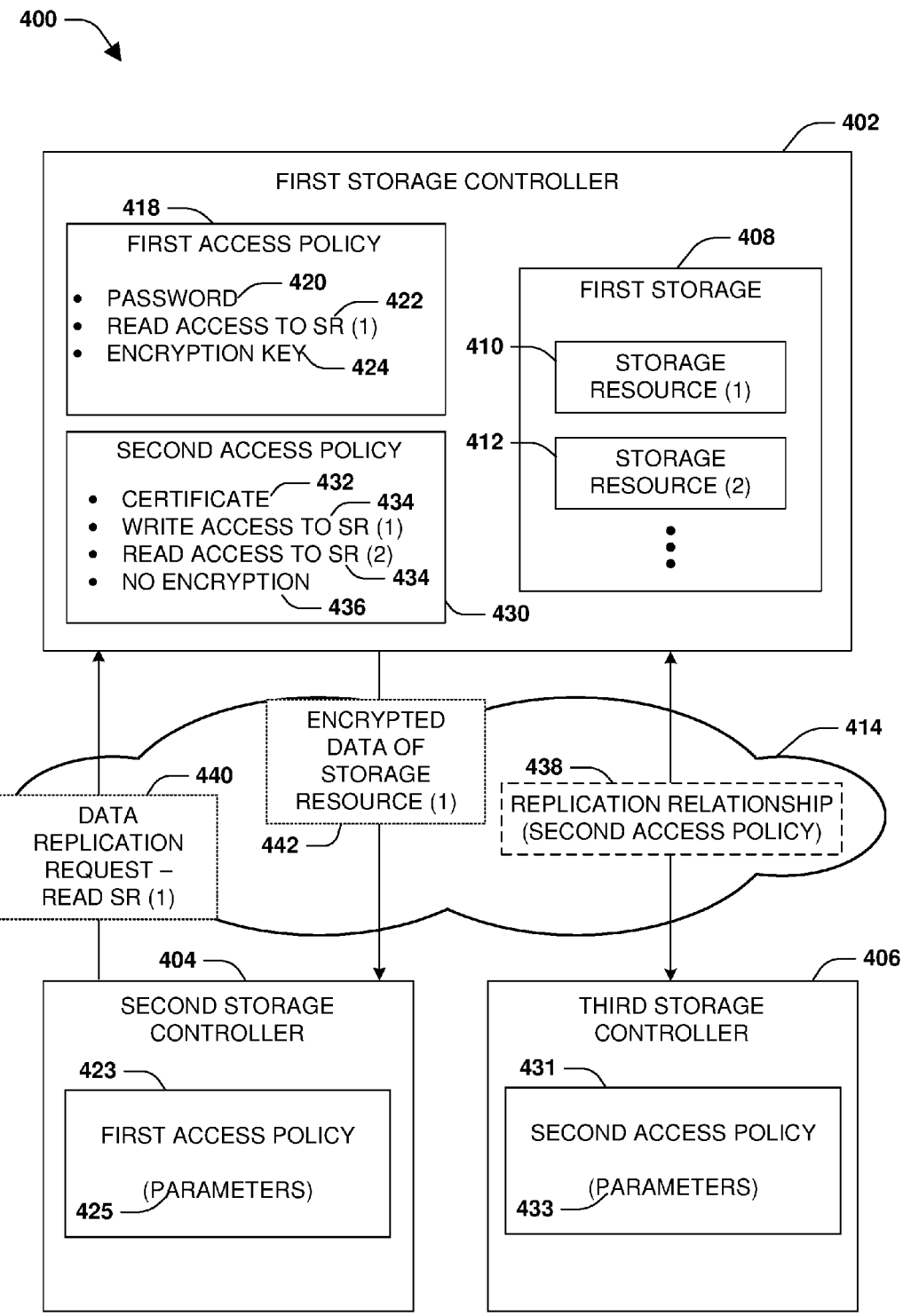
FIG. 4F is a component block diagram illustrating an exemplary computing device for secure data replication, where a data replication request is authenticated and authorized.

FIG. 4F illustrates the second storage controller 404 utilizing the parameters 425 within the corresponding first access policy 423 to construct a data replication request 440 to read data of the first storage resource 410. For example, the data replication request 440 may comprise a password agreed upon between the first storage controller 402 and the second storage controller 404 when establishing the first access policy 418. The second storage controller 404 may send the data replication request 440 to the first storage controller 404. Responsive to the first storage controller authenticating, using the authentication mechanism 420, the password to determine that the data replication request 440 originated from the second storage controller 404 and authorizing the read access to the first storage resource 410 using the authorization mechanism 422, the first storage controller 402 may provide encrypted data 442 of the first storage resource 410 to the second storage controller 404 based upon the access control mechanism 424. In this way, the second storage controller 404 may decrypt the encrypted data 442 and store the decrypted data for data protection in the event the first storage controller fails 402.

Figure 4G:
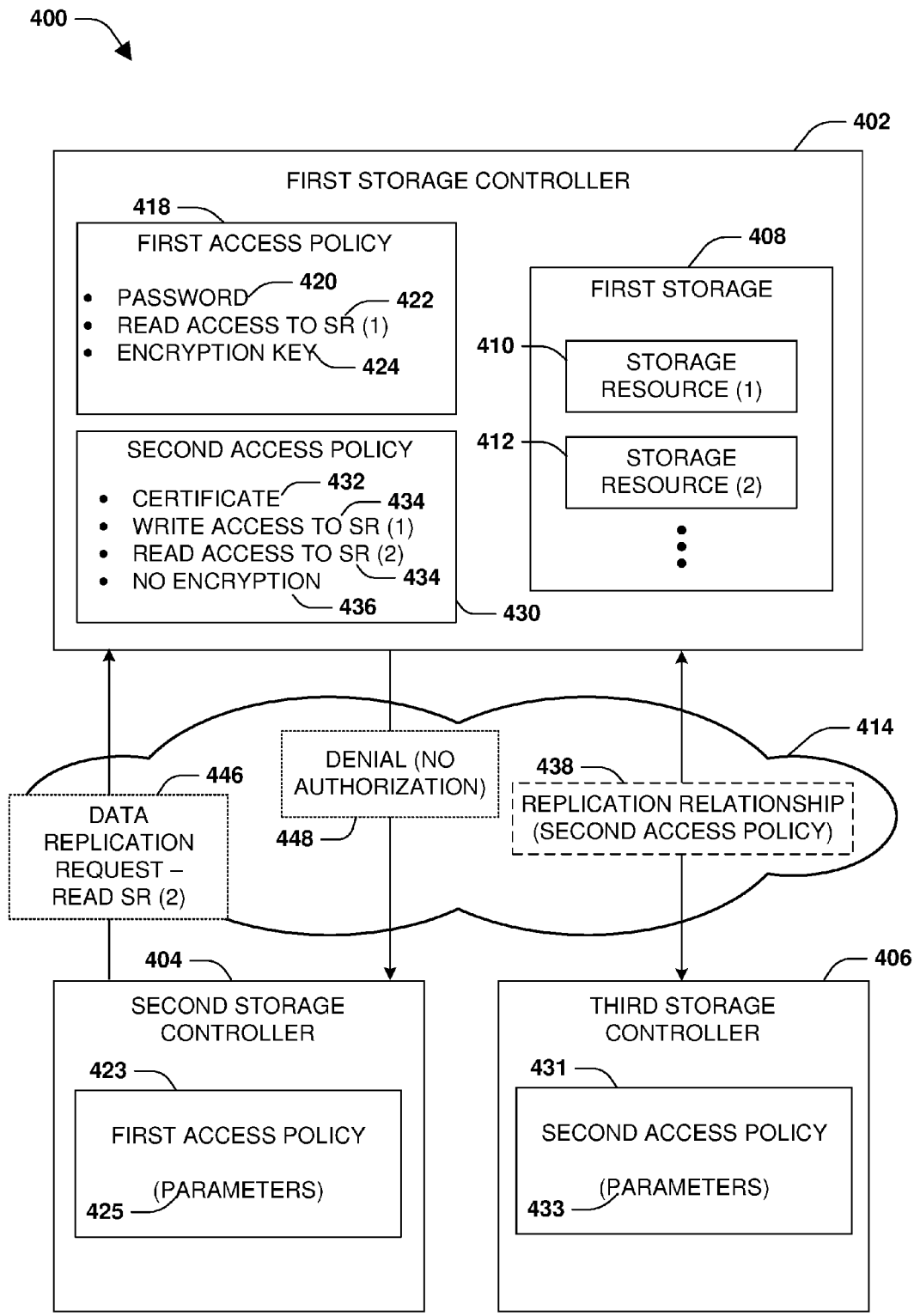
FIG. 4G is a component block diagram illustrating an exemplary computing device for secure data replication, where a data replication request is authenticated but not authorized.

FIG. 4G illustrates the second storage controller 404 utilizing the parameters 425 within the corresponding first access policy 423 to construct a second data replication request 446 to read data of the second storage resource 412. For example, the second data replication request 446 may comprise the password agreed upon between the first storage controller 402 and the second storage controller 404 when establishing the first access policy 418. The second storage controller 404 may send the second data replication request 446 to the first storage controller 404. Responsive to the first storage controller authenticating, using the authentication mechanism 420, the password to determine that the second data replication request 446 originated from the second storage controller 404 but not authorizing the read access to the second storage resource 412 because the authorization mechanism 422 does not provide the second storage controller 404 with authorization to read the second storage resource 412, the first storage controller 402 may provide an authorization denial message 448 to the second storage controller 404.

Figure 4H:
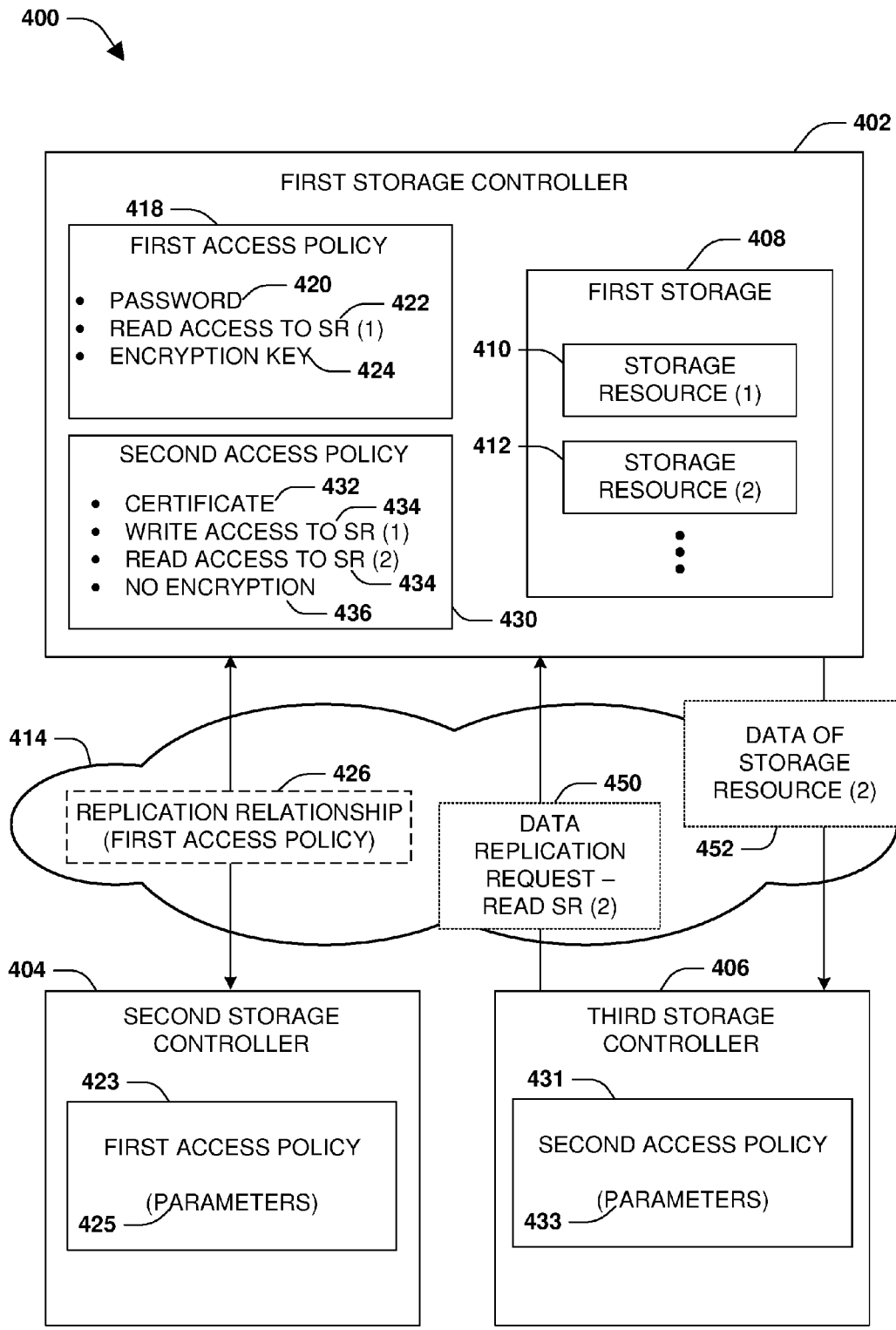
FIG. 4H is a component block diagram illustrating an exemplary computing device for secure data replication, where a data replication request is authenticated and authorized.

FIG. 4H illustrates the third storage controller 406 utilizing the parameters 433 within the corresponding second access policy 431 to construct a third data replication request 450 to read data of the second storage resource 412. For example, the data replication request 440 may comprise a certificate agreed upon between the first storage controller 402 and the third storage controller 406 when establishing the second access policy 430. The third storage controller 460 may send the third data replication request 450 to the first storage controller 404. Responsive to the first storage controller 404 authenticating, using the second authentication mechanism 432, the certificate to determine that the second data replication request 450 originated from the third storage controller 406 and authorizing the read access to the second storage resource 412 using the second authorization mechanism 434, the first storage controller 402 may provide data 452 of the second storage resource 412 to the third storage controller 406 based upon the second access control mechanism 436.

Figure 4I:
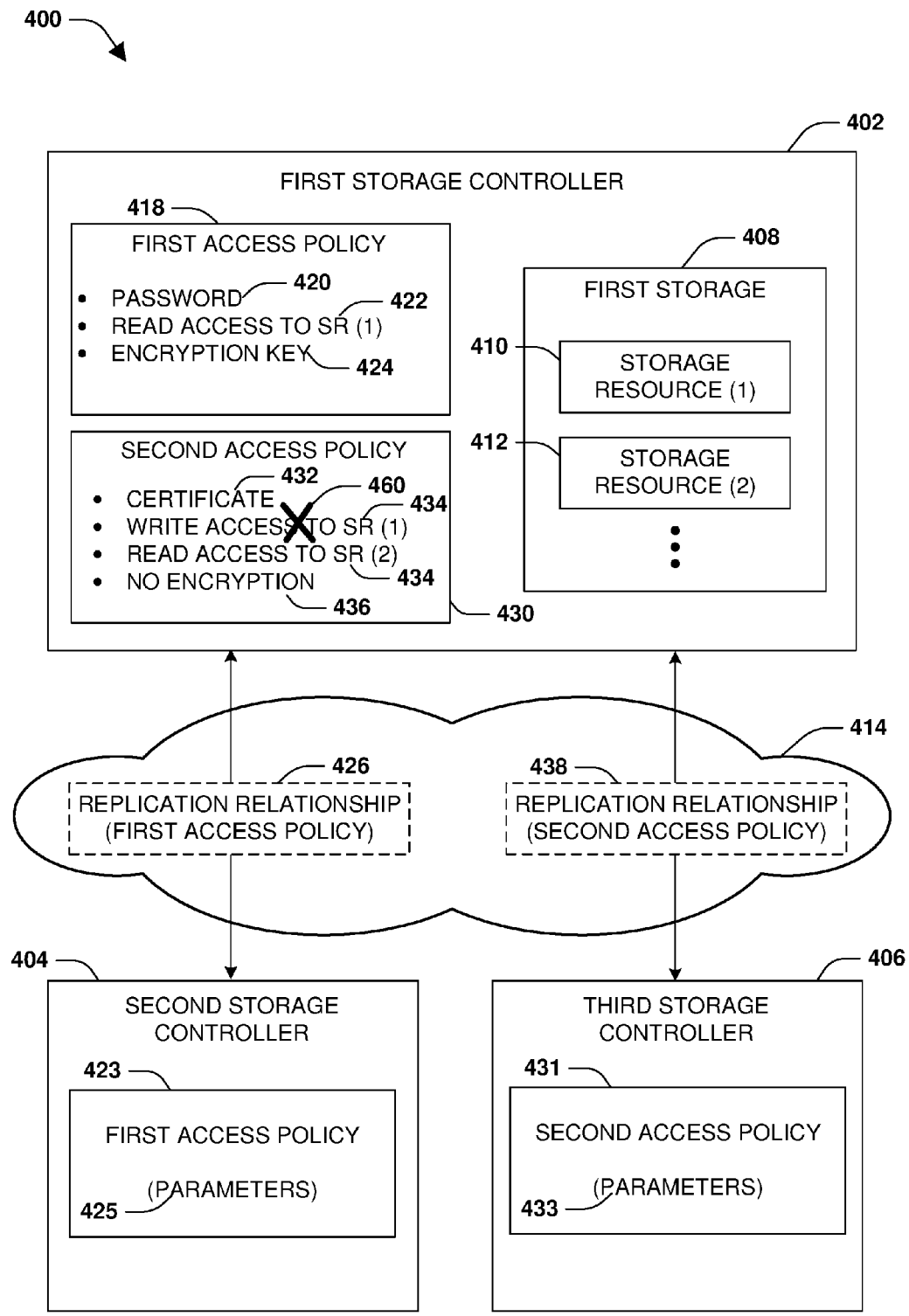
FIG. 4I is a component block diagram illustrating an exemplary computing device for secure data replication, where a second access policy is unilaterally modified.

FIG. 4I illustrates the first storage controller 402 unilaterally modifying 460 the second access policy 430 without consent of the third storage controller 406. For example, the first storage controller 402 may unilaterally modify 460 the second access policy 430 by removing authorization for the third storage controller 406 to write to the first storage resource 410. It may be appreciated that the first storage controller 402 may add to, remove from, or modify an access policy and/or mechanism defined therein.

Figure 4J:
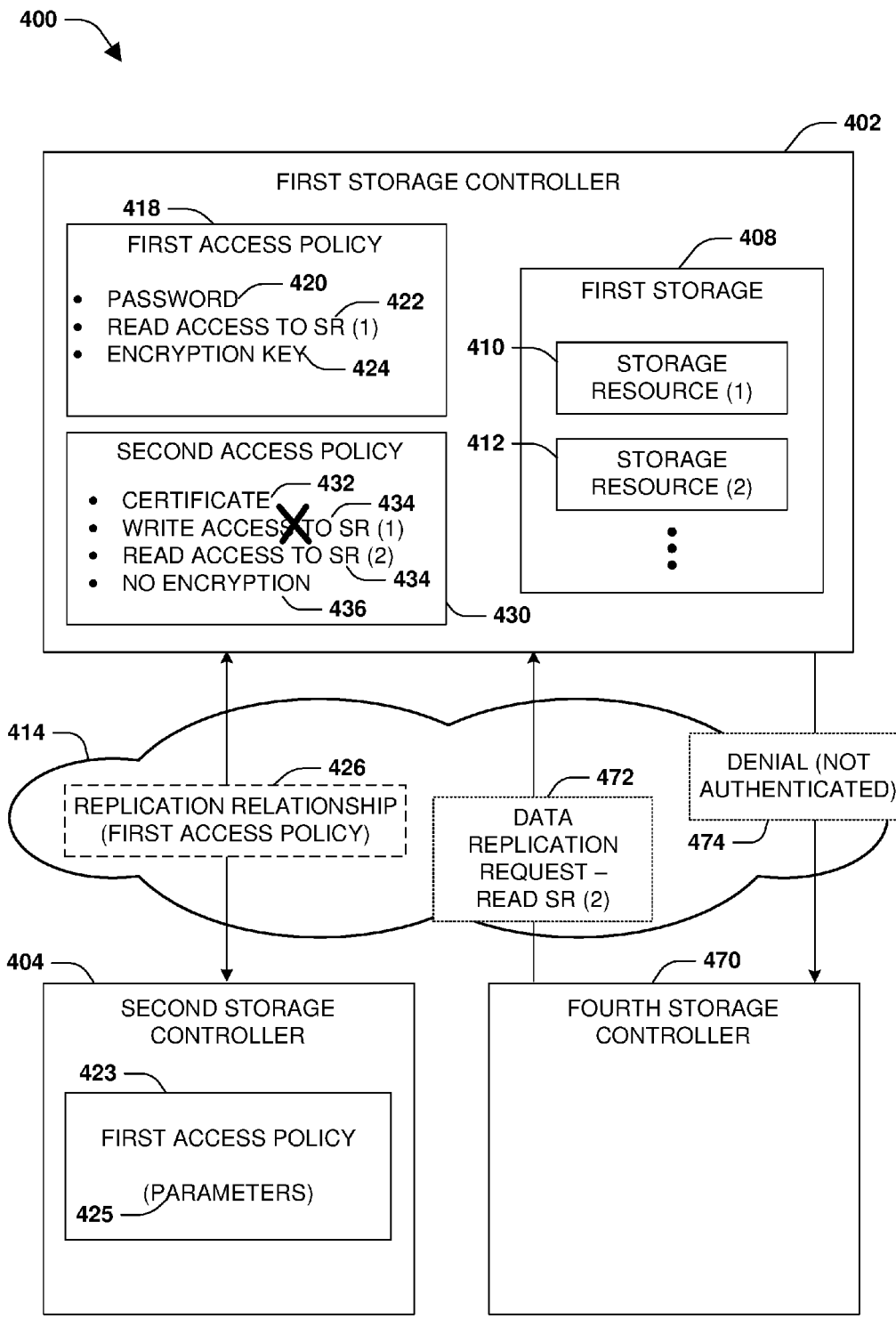
FIG. 4J is a component block diagram illustrating an exemplary computing device for secure data replication, where a data replication request is not authenticated.

FIG. 4J illustrates a fourth storage controller 470 sending a data replication request 472 to the first storage controller 402 in an attempt to spoof as the third storage controller 406 for gaining unauthorized access to read the second storage resource 412. Because the data replication request 472 does not comprise the certificate, specified within the second authentication mechanism 432 of the second access policy 430, agreed upon between the first storage controller 402 and the third storage controller 406 when establishing the second access policy 430, the first storage controller 402 may not authenticate the fourth storage controller 470 (e.g., the second authentication mechanism 432 may indicate that the data replication request 472 did not originate from the third storage controller 406). Accordingly, the first storage controller 402 may send an authentication denial message 474 to the fourth storage controller 470.

Figure 5:
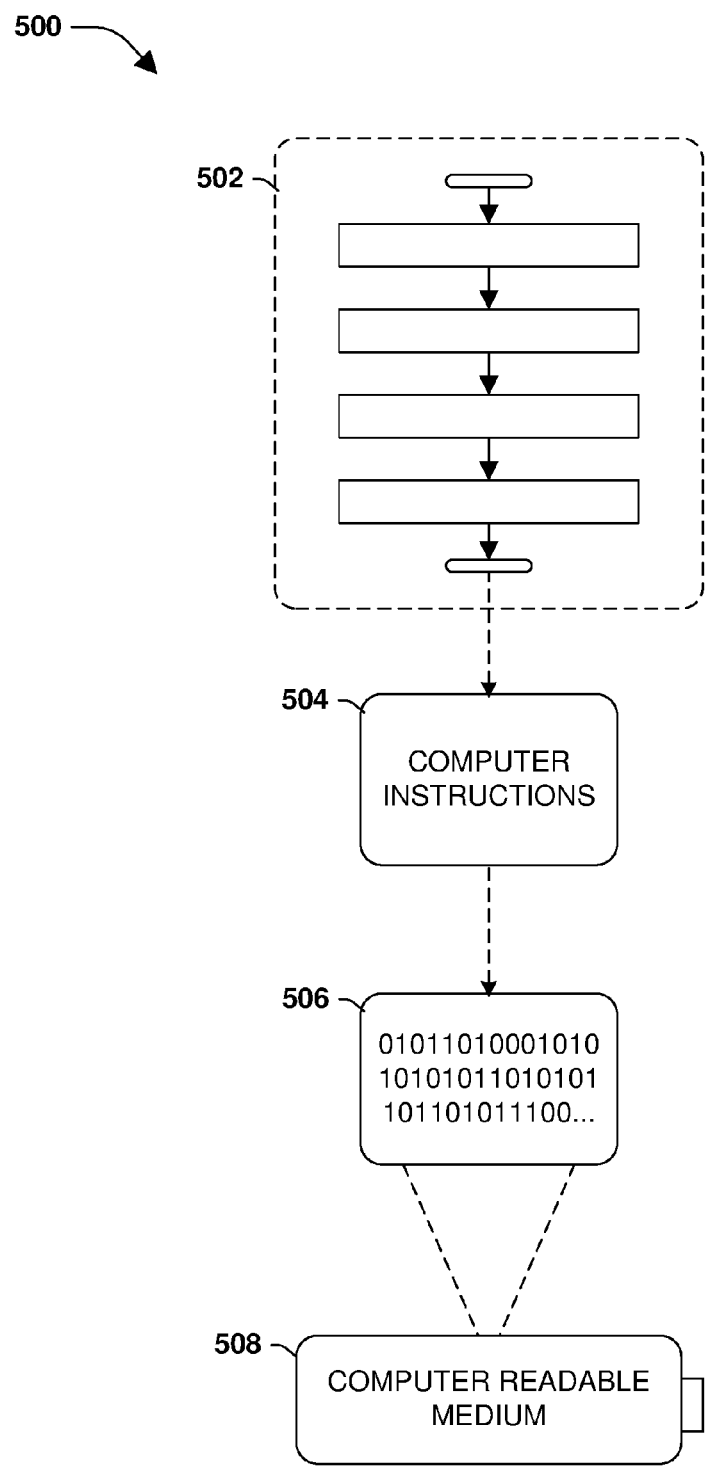
FIG. 5 is an example of a computer readable medium in accordance with one or more of the provisions set forth herein.

Still another embodiment involves a computer-readable medium comprising processor-executable instructions configured to implement one or more of the techniques presented herein. An example embodiment of a computer-readable medium or a computer-readable device that is devised in these ways is illustrated in FIG. 5, wherein the implementation 500 comprises a computer-readable medium 508, such as a CD-ft DVD-R, flash drive, a platter of a hard disk drive, etc., on which is encoded computer-readable data 506. This computer-readable data 506, such as binary data comprising at least one of a zero or a one, in turn comprises a processor-executable computer instructions 504 configured to operate according to one or more of the principles set forth herein. In some embodiments, the processor-executable computer instructions 504 are configured to perform a method 502, such as at least some of the exemplary method 300 of FIG. 3, for example. In some embodiments, the processor-executable computer instructions 504 are configured to implement a system, such as at least some of the exemplary system 400 of FIGS. 4A-4J, for example. Many such computer-readable media are contemplated to operate in accordance with the techniques presented herein.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), EEPROM and/or flash memory, CD-ROMs, CD-Rs, CD-RWs, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:
    establishing, by a storage server, an access policy for a storage resource within first storage hosted by a first storage controller, wherein the establishing comprises:
        defining, within the access policy, an authentication mechanism for authenticating a second storage controller as having a trusted relationship with the first storage controller;
        defining, within the access policy, an authorization mechanism specifying a type of access that the second storage controller has for the storage resource; and
        defining, within the access policy, an access control mechanism specifying how the second storage controller's access to data of the storage resource is to be controlled;
    establishing a replication relationship between the first storage controller and the second storage controller for replicating data from the first storage to second storage hosted by the second storage controller;
    attaching the access policy to the replication relationship; and
    responsive to receiving a data replication request, targeting the storage resource, associated with the replication relationship:
        utilizing the authentication mechanism to determine whether the data replication request originated from the second storage controller;
        utilizing the authorization mechanism to determine whether a requested type of access to the storage resource is authorized for the second storage controller; and
        responsive to successful authentication and authorization, providing access to the data according to the access control mechanism.

2. The method of claim 1, wherein the first storage controller and the second storage controller are heterogeneous storage controllers with at least one of different storage architectures, different storage operating systems, and different file systems.

3. The method of claim 1, wherein the defining an authentication mechanism comprises:
    negotiating at least one of a certificate authentication mechanism, a password authentication mechanism, a public/private key authentication mechanism, and an automatic authentication mechanism between the first storage controller and the second storage controller.

4. The method of claim 1, wherein the defining an authorization mechanism comprises:
    specifying that the second storage controller has at least one of read access, write access, and no access to the storage resource.

5. The method of claim 1, wherein the first storage comprises a second storage resource, and the method comprising:
    specifying, within the authorization mechanism, a second type of access that the second storage controller has for the second storage resource.

6. The method of claim 5, wherein the type of access to the storage resource is different than the second type of access to the second storage resource.

7. The method of claim 1, wherein the defining an access control mechanism comprises:
    negotiating an encryption key for the first storage controller to use for encrypting requested data of the storage resource for sending to the second storage controller in response to data replication requests from the second storage controller.

8. The method of claim 1, comprising:
    attaching the access policy as a shared access policy to a second replication relationship between the first storage controller and a third storage controller, the shared access policy associating the authentication mechanism, the authorization mechanism, and the access control mechanism with the third storage controller.

9. The method of claim 1, comprising:
    establishing a second access policy for the storage resource, wherein the establishing comprises:
        defining, within the second access policy, a second authentication mechanism for authenticating a third storage controller as having a second trusted relationship with the first storage controller;

defining, within the second access policy, a second authorization mechanism specifying a second type of access that the second storage controller has for the storage resource; and defining, within the second access policy, a second access control mechanism specifying how the third storage controller's access to data of the storage resource is to be controlled.

10. The method of claim 9, wherein the type of access to the storage resource is different than the second type of access to the storage resource.

11. The method of claim 9, wherein the authentication mechanism is different than the second authentication mechanism.

12. The method of claim 9, wherein the access control mechanism is different than the second access control mechanism.

13. The method of claim 1, comprising:

unilaterally modifying, by the first storage controller without consent of the second storage controller, the access policy.

14. The method of claim 1, wherein the access policy is defined between a first storage virtual machine of the first storage controller and a second virtual machine of the second storage controller.

15. A non-transitory machine readable medium having stored thereon instructions for performing a method comprising machine executable code which when executed by at least one machine, causes the machine to:

establish, at a second storage controller, an access policy for a storage resource within first storage hosted by a first storage controller, the access policy comprising parameters associated with an authentication mechanism for the first storage controller to authenticate the second storage controller, an authorization mechanism specifying a type of access that the second storage controller has for the storage resource, and an access control mechanism specifying how the second storage controller's access to data of the storage resource is to be controlled;

establish a replication relationship between the first storage controller and the second storage controller for replicating data from the first storage to second storage hosted by the second storage controller;

attach the access policy to the replication relationship;

construct a data replication request comprising the parameters from the access policy; and send the data replication request, requesting access to data of the storage resource, to the first storage controller.

16. The non-transitory machine readable medium of claim 15, wherein the machine executable code causes the machine to:

receive data, of a snapshot of the storage resource, from the first storage controller in response to the first storage controller authenticating the second storage controller and authorizing snapshot replication access to the data of the storage resource based upon the data replication request.

17. The non-transitory machine readable medium of claim 15, wherein the machine executable code causes the machine to:

receive an access denial response from the first storage controller in response to the first storage controller authenticating the second storage controller and not authorizing a type of access to the data of the storage resource requested by the data replication request.

18. A computing device comprising:

a memory containing machine readable medium comprising machine executable code having stored thereon instructions for performing a method; and a processor coupled to the memory, the processor configured to execute the machine executable code to cause the processor to:

receive a data replication request from a second storage controller having a replication relationship with a first storage controller hosting first storage, the data replication request targeting a storage resource of the first storage;

evaluate parameters, within the data replication request, using an authentication mechanism defined within an access policy attached to the replication relationship in order to authenticate or not authenticate the second storage controller;

responsive to authenticating the second storage controller, evaluate the parameters using an authorization mechanism defined within the access policy in order to determine whether a requested type of access to the storage resource is authorized for the second storage controller; and responsive to successful authentication and authorization, provide access to data according to an access control mechanism defined within the access policy.

19. The computing device of claim 18, wherein the access policy is a default access policy.

20. The computing device of claim 18, wherein the access to the data comprises at least one of a baseline transfer of the storage resource or an incremental transfer of delta data of the storage resource, the delta data corresponding to changes to the storage resource since a last transfer of data to the second storage controller.

* * * * *